United States Defensive Publication [19] (H) [11] T100,601

Chance et al. [43] May 5, 1981

[54] COMPOSITIONS AND PROCESSES FOR PRODUCING FLAME RETARDANT TEXTILE MATERIALS BASED ON METHYLOLAMINOTRIHALOPROPYL TRIAZINES AND ANTIMONY OXIDES

[76] Inventors: Leon H. Chance, 715 Ursulines St., New Orleans, La. 70116; Judy D. Timpa, 2320 Metairie Ct., Metairie, La. 70001; George L. Drake, Jr., 2009 Elizabeth Ave., Metairie, La. 70003

[21] Appl. No.: 134,014

[22] Filed: Mar. 26, 1980

[51] Int. Cl.[3] ..... D06M 13/44; D06M 13/34; D06M 9/00

[52] U.S. Cl. ..... 8/115.7; 8/116 P; 8/183

[57] ABSTRACT

The tetramethylol derivatives of 2,4-diamino-6(3,3,3-tribromo-1-propyl)-1,3,5-triazine and 2,4-diamino-6(3,3,3-trichloro-1-propyl)-1,3,5-triazine, namely: 2,4-bis[di(hydroxymethyl)amino]-6-(3,3,3-tribromo-1-propyl)-1,3,5-triazine and 2,4-bis[di(hydroxymethyl-)amino]-6-(3,3,3-trichloro-1-propyl)-1,3,5-triazine, respectively, were used in combination with colloidal antimony oxides and or water emulsifying agents and suitable solvent to impart durable flame-retardancy to cellulosic materials, protein fibers such as wool, and to blends of cellulosic materials and synthetic fibers, particularly to cotton textiles or textiles composed of blends of cotton and polyester. Afterglow was eliminated by the use of small amounts of reactive phosphorus compounds.

8 Claims, No Sheets Drawing,

27 Pages Specification

The file of this unexamined application may be inspected and copies thereof may be purchased (849 O.G. 1221, Apr. 9, 1968).